United States Patent [19]

Kutilek, III et al.

[11] Patent Number: 5,770,217
[45] Date of Patent: Jun. 23, 1998

[54] DIETARY SUPPLEMENT FOR HEMATOLOGICAL, IMMUNE AND APPETITE ENHANCEMENT

[75] Inventors: Frank J. Kutilek, III, Cheney; J. R. Duell Gates, Haysville, both of Kans.

[73] Assignee: Atlatl, Inc., Guthrie, Okla.

[21] Appl. No.: 887,103

[22] Filed: Jul. 2, 1997

[51] Int. Cl.$^6$ .................................................. A61K 9/20
[52] U.S. Cl. ...................... 424/442; 424/441; 424/195.1; 424/465; 424/481; 424/459
[58] Field of Search ..................................... 424/441, 442, 424/195.1, 445, 481, 459

[56] References Cited

U.S. PATENT DOCUMENTS

| | | | |
|---|---|---|---|
| 3,710,512 | 1/1973 | Tamaki et al. | 47/58 |
| 4,419,349 | 12/1983 | Kojima et al. | 424/195 |
| 4,497,795 | 2/1985 | Cummins | 424/85 |
| 4,501,734 | 2/1985 | Tanaka et al. | 514/198 |
| 4,684,628 | 8/1987 | Liu | 514/26 |
| 4,708,949 | 11/1987 | Liu | 514/26 |
| 4,808,629 | 2/1989 | Liu | 514/557 |
| 4,843,067 | 6/1989 | Liu | 514/54 |
| 4,886,666 | 12/1989 | Liu | 424/195 |
| 4,891,357 | 1/1990 | Kalra | 514/12 |
| 4,966,893 | 10/1990 | Pang et al. | 514/54 |
| 5,055,297 | 10/1991 | Fujimake et al. | 424/195 |
| 5,124,357 | 6/1992 | Newton et al. | 514/554 |
| 5,178,865 | 1/1993 | Ho et al. | 424/195 |
| 5,332,579 | 7/1994 | Umbdenstock | 424/639 |
| 5,409,905 | 4/1995 | Eby, III | 514/23 |
| 5,430,066 | 7/1995 | Cook et al. | 514/558 |
| 5,466,547 | 11/1995 | Khoe | 424/439 |
| 5,545,670 | 8/1996 | Bissbort et al. | 514/562 |
| 5,547,671 | 8/1996 | Duthinh | 424/195.1 |
| 5,556,644 | 9/1996 | Chandra | 424/630 |
| 5,567,424 | 10/1996 | Hastings | 424/195.1 |
| 5,589,182 | 12/1996 | Tashiro et al. | 424/423 |

*Primary Examiner*—Thurman K. Page
*Assistant Examiner*—D. Faulkner
*Attorney, Agent, or Firm*—Dunlap & Codding, P.C.

[57] ABSTRACT

A dietary supplement comprising herbs and herbal extracts, vitamins, minerals, and amino acids effective in modulating hematological toxicities, enhancing the immune system and maintaining appetite and weight.

22 Claims, No Drawings

DIETARY SUPPLEMENT FOR HEMATOLOGICAL, IMMUNE AND APPETITE ENHANCEMENT

BACKGROUND

The present invention is related to the field of natural dietary and nutritional supplements, and more particularly to those dietary supplements which are effective in alleviating adverse hematological, immunological and appetite conditions in animals, particularly in humans.

It is now well established that nutrition is a critical determinant of hematological and immunological competence. Malnutrition and deficiencies of various nutrients impair several immune responses, particularly cell-mediated immunity. Weight loss and appetite suppression are well known complications of chemotherapy and/or radiation treatment. Further, considerable data indicate that lack of appetite and subsequent nutritional problems are common in old age. Furthermore, the simultaneous assessment of nutritional status, immune responses and subsequent correlation analysis have suggested that impaired immunity in the elderly may be due in part to the associated nutritional deficiencies.

A variety of oriental herbs and medicines have been used as pharmaceutical agents having varying degrees of effectiveness in the treatment of physiological problems and disease conditions, including cerebro- and cardiovascular diseases, cancer, immune deficiencies, depression, Alzheimer's disease, and appetite loss, for example. U.S. Patents disclosing Chinese medicines derived from plant materials useful for the treatment of various diseases and their sequela include U.S. Pat. Nos. 4,906,470; 4,708,949; 4,755,504; 4,795,742; 4,999,376; 5,128,131; 5,162,037; 4,966,893; and 5,137,878. Other U.S. Patents disclosing various therapeutic properties of Chinese medicines derived from certain Chinese herbs and plants include: 4,042,592; 4,200,629; 4,339,435; 4,419,349; 4,469,685; 4,528,192; 4,618,495; 4,684,628; 4,717,664; 4,769,363; 4,795,739; 4,842,859; 4,843,067; 4,869,903; 4,886,666; 4,898,890; 4,906,471; 5,055,297; 5,178,865; 5,190,757; 5,204,369 and 5,589,182. Chinese medicines for the treatment of heart disease are also described in Chinese Patent Nos. CN 1033567; CN 1041279 and CN 87101313.

In spite of the above, the prior art generally does not reveal a dietary supplement which has the desired combination of safety, effectiveness and low cost which is needed for treating a large number of patients who have very different medical conditions and socio-economic backgrounds. Accordingly, there is a continuous search in the art for a medicine or dietary supplement that is safe, useful and inexpensive for the prevention and treatment of immunological and hematological conditions and for weight maintenance.

SUMMARY OF THE INVENTION

The present invention provides a dietary supplement in unit dosage form adapted particularly for oral consumption by a subject in need of enhancement of the immune system to combat infections and to achieve various other beneficial results such as maintenance of normal hematologic parameters and enhancement of appetite or mitigation of weight loss. As shown herein nutritional supplementation with selected herbs and nutrients can improve certain aspects of the immune and blood system. The dietary supplement comprises an effective mixture of herbal extracts and powders, vitamins, minerals, amino acids, and various excipients. The dietary supplement described herein may be consumed as a tablet or capsule or may further be prepared as a composition for being consumed as a beverage wherein the supplement is prepared as an essentially dry mixture which is mixed with an ingestible liquid to form an aqueous beverage.

The substance or composition of the invention is thus particularly suitable for use in a method of treating human or animal subjects to correct or prevent hematologic and immunological deficiencies of such subjects. Because the substance or composition according to the invention has the effect of enhancing the immune response system and correcting immunological deficiencies of human and animal subjects, the substance or composition is also particularly effective for use in a method of treating human or animal subjects to combat infections of such subjects.

The dietary supplement according to the invention therefore is particularly effective for treating human or animal subjects to combat bacterial, fungal and viral infections, and not only those causing diseases such as cold and influenza but also opportunistic infections in immunocompromised or immunosuppressed subjects undergoing chemotherapy, radiation therapy, and subjects suffering from the effects of old age. The dietary supplement is intended to be particularly useful for those adult humans over 65 years of age in improving immune system response and reducing the frequency of infection and in particular, respiratory infection, and in maintaining the subject's appetite to minimize weight loss thereby maintaining overall health.

It is therefore an object of the present invention to provide a novel dietary supplement suitable for the treatment in a subject of adverse immunological and hematological conditions and for appetite enhancement which is derived from specific combinations of herbs and herbal extracts, particularly of oriental plants, and preferably of various vitamins, minerals and nutrients.

DETAILED DESCRIPTION OF THE INVENTION

The present invention provides a nutritional or food supplement in unit dosage form adapted for oral consumption by a subject in need of enhancement of the immune system to combat viral, bacterial and other infections in such subjects and to achieve various other beneficial results such as maintenance of normal hematologic conditions and enhancement of appetite or mitigation of weight loss. As shown herein nutritional supplementation with selected herbs and nutrients can improve certain aspects of the immune system. The dietary supplement comprises an effective mixture of herbal extracts and powders, vitamins, minerals, amino acids, and various excipients. The dietary supplement described herein may be prepared for oral consumption in the form of a tablet or capsule or may further be prepared as a composition for being consumed as a beverage wherein the supplement is prepared as an essentially dry mixture which is mixed with an ingestible liquid to form an aqueous beverage.

The substance or composition of the invention is thus particularly suitable for use in a method of treating human or animal subjects to correct or prevent hematologic and immunological deficiencies of such subjects. Because the substance or composition according to the invention has the effect of enhancing the immune response system and correcting immunological deficiencies of human and animal subjects, the substance or composition is also particularly effective for use in a method of treating human or animal subjects to combat viral, bacterial or fungal infections in such subjects.

Although all of the natural herbs described here in have been individually utilized in traditional Chinese folk medicines for a variety of treatments, it has not been previously disclosed that the active components described above in combination would produce a composition with the remarkable synergistic therapeutic effects of the dietary supplements of the present invention. The present invention is based on the unexpected discovery that the extracts and ground portions of the herbs listed herein combine to produce a new highly effective and safe agent for the treatment of hematological conditions, immunosuppression and eating disorders occurring either singly or in combination with each other. The dietary supplement exhibits the highly advantageous combination of being relatively inexpensive, highly effective and of low toxicity thereby exhibiting no detectable hazardous side effects.

The dietary supplement according to the invention therefore is particularly effective for treating human or animal subjects to combat bacterial, fungal and viral infections, and not only those causing diseases such as cold and influenza but also opportunistic infections in immunocompromised and immunosuppressed subjects undergoing chemotherapy, radiation therapy and other intensive treatments, and in subjects suffering from the effects of old age. Therefore, the dietary supplement is intended to be particularly useful for those adult humans over 65 years of age in improving immune system response and reducing the frequency of infection and in particular, respiratory infection, and in maintaining the appetite to minimize weight loss thereby maintaining overall health.

The substance or composition in accordance with the invention may also be used for treating a variety of animals to achieve beneficial results as set out herein, namely to poultry (including turkeys and other gallinaceous birds), ostriches, birds held in captivity in aviaries, horses, pigs, cattle, goats, other livestock animals and other ruminant and non-ruminant animals.

The present invention, in its preferred version, contains a blend of 12 different herbs or herbal extracts, including a crucifer extract (preferably derived from a member of the Brassica genus, and most preferably *Brassica pekingensis*), *Vigna sinensis* (mung bean), *Eleutherococcus senticosis* (Siberian ginseng), *Schizandra chinensis* (Asiatic Cornelium cherry), *Panax quinquefolium* (American ginseng), *Ligustrum lucidum* (chinese privet), *Echinacea angustifolia* (coneflower), *Artemesia annus* (Sweet wormwood), *Astraglus membranaceous* (Astraglus), *Glycyrrhiza glabra* (licorice root), *Millettia dielsiana* (Pinyin, Ju Xue Teg), and *Ophiopogon japonicus* (Mai Men Dong).

As indicated below, each of these herbs or herbal extracts is known to have various effects beneficial to human health. However, it has been newly discovered that these herbs and herbal extracts, when consumed in the combinations described herein, have enhanced beneficial effects regarding immune enhancement, maintenance of normal hematologic characteristics and maintenance of body weight through appetite enhancement. The present invention is a natural formulation which further has significant value in preventing undesirable side effects of radiation treatments and chemotherapy, including hematologic problems such as anemia, leukopenia, neutropenia, and thrombocytopenia, secondary infections, loss of appetite and weight, and fatigue. As shown below, the dietary supplement of the present invention is effective in counteracting anemia, leukopenia, neutropenia and thrombocytopenia, especially in individuals undergoing chemotherapy and radiation therapy for various forms of cancer.

The herbal ingredients described herein are commercially available in oriental natural food shops, natural health stores or pharmacies, or can be easily prepared as dry powders using processes well known to those skilled in the art. All of the herbal components contained in this product are in the Generally Considered Safe (GCS) category.

Herbs and Herbal Extracts

Crucifer extract (*Brassica pekingensis*): This extract contains dithiolthiones, sulphoraphane and related boronyl isothiocyanates which have been shown to selectively prevent normal tissues from developing cancer from lethal doses of ionizing radiation as well as protect human cells from chemical carcinogens and the toxic effects of chemotherapeutic agents. The indoles in Brassica(s) have been shown to have effectiveness in the treatment of degenerative diseases including ASVD and arthritis. They are potent free radical scavengers. The manufacture of this extract is a well recognized non-proprietary two phase procedure involving a water and ethanol extraction and concentration process.

*Vigna sinensis*

(Mung Bean): This powder, formulated by grinding mung beans, contains super oxide dismutase (SOD), which destroys highly damaging peroxides and other highly destructive oxidizing free radicals. It has been demonstrated to improve the appetite and is effective in maintaining renal and hepatic function.

*Eleutherococcus senticosis*

(Siberian ginseng) : This herb, used herein as a powder formed by grinding portions of the root, is botanically unrelated to the true "Panax" ginseng family, but has been shown to contain many of the same active compounds. It has been shown to have effectiveness in protecting normal cells from the lethal and damaging effects of ionizing radiation, x-rays and microwaves. It also appears to lower total cholesterol, LDL and VLDL while raising HDL levels. It has been shown to counteract and prevent fatigue most likely due to its content of the complex organic mineral "germanium" which eliminates the fatigue associated with chronic viral infections i.e. Herpes Simplex virus, Varicella zoster, and Epstein-Barr virus. It appears to stimulate gamma globulin and interferon production.

*Schizandra chinensis*

(Asiatic Cornelium Cherry): This herb, used herein as a powder formed by grinding the berry, has components which are effective free radical scavengers. It has been demonstrated as effective against viral, bacterial and fungal infections as well as the damaging effects of ionizing radiation. It has been shown to inhibit inflammatory reactions by preventing the formation and activation of the arachidonic acid pathway. The herb interacts synergistically with Eleutherococus.

*Panax quinquefolium*

(American Ginseng) : This herb, used herein as a powder formed by grinding the root, has been shown to be effective against infectious disease, and fatigue. It stimulates gammaglobulin and interferon production, and also contains the potent free radical scavenger germanium. It has been shown to normalize blood pressure as well as improve cerebral blood flow.

*Ligustrum lucidum*

(Chinese Privet): This herb, used herein as a powder formed by grinding portions of the roots, stems and leaves, is generally classified as an adaptogen which energizes and stimulates the immune system when used synergistically in combination with other herbs such as Artemisia, Echinacea, Astragalus and Glycyrrhiza.

*Echinacea angustifolia*

(Coneflower/Wild Daisy): This herb, used herein as a powder formed by grinding portions of the root, contains complex polysaccharides, fatty acids and glycosides which have been shown to improve immune reactivity by increasing T-cell counts, improving killer cell activity, phagocytosis and stimulating the release of interferon. In addition it contains an interferon-like substance which inhibits primary and secondary viral entry into host cells, echinacoside (a potent broad spectrum antibiotic with gram negative/positive activity) and echinacein (a potent hyaluronidase inhibitor which in addition to preventing bacterial invasion of tissues, stimulates fibroblastic proliferation and accelerates wound healing). The herb has also exhibited anti-fungal, anti-protozoal, anti-inflammatory and tumor regression activity. It is effective in stimulating production of alpha-, beta- and gamma-globulin.

*Artemisia annus*

(Sweet Wormwood): This herb, used herein as a powder formed by grinding the stems and leaves, is an adaptogen with anti-bacterial, anti-fungal and anti-viral activity which works synergistically with Ligustrum, Astragalus, Echinacea and Glycyrrhiza.

*Astragalus membranaceous*

(Astragalus, Huang Qi): This herb, used herein as a powder formed by grinding the stems and leaves, has long been used in traditional oriental medicine for conditions exhibiting fatigue and wasting. The herb contains at least 8 major polysaccharide fractions which have exhibited immuno-modulating activity. Fractions 3, 7, and 8 have been shown to stimulate interferon production, mononuclear cell proliferation (both granulocytic and lymphocytic series), accelerate phagocytosis and restore T-cell function in immuno-compromised and immuno-suppressed individuals. Studies on cyclophosphamide induced immuno-incompetent rats showed not only complete restoration of cellular immunity and T-cell function, but that restored immunity was greater than normal subjects. Furthermore, the same phenomenon has been in observed in human cancer subjects who have been immuno-compromised by radiation, chemo- or combination therapy. This may be due in part to its ability to prevent hepatotoxicity from radiation and chemotherapeutic agents as well as its documented ability to synergize recombinant interferon against chronic viral disease i.e., Varicella zoster, Herpes Simplex virus, Human Papilloma virus and Epstein-Barr virus. It increases the patient's energy, appetite and sense of well being.

*Glyzcyrrhiza glabra*

(Licorice Root): This herb, used herein as a powder formed by grinding portions of the root, has been shown to stimulate T-cell activity and interferon production and to reduce inflammation and fatigue through its content of glycyrrhizic acid which results in increased glucocorticoid and mineralocorticoid activity. It is effective in healing duodenal ulcers and has a much lower reoccurrence rate. It has exhibited significant antiviral activity against Hepatitis B, Epstein-Barr virus and Cytomegalovirus. It maintains normal blood pressure and sugar levels. According to the invention, various kinds of licorice plants can be used, for example, *Glycyrrhiza glabra Linne* var. *glandulifera Rgl.* et Herd., *G. uralensis* D.C., *G. echinata L.*

*Millettia dielsiana*

(Pinyin/Ju Xue Teg): This herb, used herein as a powder formed by grinding the stems and leaves, has traditionally been used in oriental medicine for anemias, inflammatory/auto-immune disorders, parasthesias, nerve conduction abnormalities, and fatigue. It is frequently used in combination with other herbs for its synergistic/potentiating effects.

*Ophiopogon japonicus*

(Mai Men Dong): This plant, used herein as a powder formed by grinding portions of the roots, stems and leaves, is used as a synergistic herb with Astragalus. It has been shown to lower blood sugar in diabetics and it exhibits antibacterial activity. Extracts of the root contain beta-sitosterol, beta-sitosterol-beta-D-glucoside and stigmasterol, ophiopogonin glycosides A, B, C, D and rusecogenin which exhibit anti-neoplastic activity. The root has also been shown to possess anti-pyretic, anti-inflammatory and anti-tussive properties.

Additional Components

The dietary supplement further comprises selenium (preferably as selenomethionine), glutathione (reduced), L-cysteine and L-methionine.

Selenium, preferably in the form of selenomethionine, is an essential mineral involved in cellular enzymatic reactions. It potentiates the anti-oxidant effects of vitamins A, E, C and beta-carotene.

Reduced glutathione is an important biomolecule involved in cellular oxidation-reduction reactions. It is a potent free radical scavenger which prevents and/or reverses the formation of disulfide groups in all cellular enzymes which deactivates them. many compositions with anti-neoplastic activity are thought to work by modulation and activation of the enzymes involved in glutathione production (glutathione synthetase) and its oxidation-reduction activity (glutathione-S-reductase and glutathione peroxidase). The compound also nonenzymatically combines with free intra-cellular cystine and reduces it to the usable cysteine.

L-cysteine is used in conjunction with selenium wherein the sulfur moiety of L-cysteine is replaced with selenium which decreases the abnormally high turnover of L-cysteine and hence the replication rate of certain types of cancerous cells primarily of hematological origin. It also combines with glycine and glutamine in vivo resulting in increased levels of glutathione. In the absence or deficiency of glutathione it serves as a reducing agent.

L-methionine enhances production of L-methionyl trans RNA which promotes synthesis of cellular proteins and enzymes. It is the primary source of methyl groups required for transmethylation reactions. This enhances the synthesis of L-carnitine from lysine by transmethylation. L-carnitine is critical to the transfer of fats containing acyl groups in and out of mitochondrial membrane which is involved in energy production.

Other Components

The dietary supplement optionally, but preferably, further comprises various vitamins, minerals and cofactors for optimal health, including vitamin A, vitamin C, vitamin E, beta-Carotene, potassium iodide, zinc amino acid chelate, and sodium alginate. The dietary supplement may comprise any or all of the above vitamins and minerals, or others listed herein.

Where used in general terms in this disclosure, the term vitamin refers to trace organic substances that are required in the diet. For the purposes of the present invention, the term vitamin(s) include, without limitation, thiamin, riboflavin, nicotinic acid, pantothenic acid, pyridoxine, biotin, folic acid, vitamin $B_{12}$, lipoic acid, ascorbic acid, vitamin A, vitamin D, vitamin E and vitamin K. Also included within the term vitamin are cofactors and coenzymes such as coenzymes include thiamine pyrophosphates (TPP), flavin mononucleotide (FMM), flavin adenine dinucleotide (FAD), nicotinamide adenine dinucleotide (AND), nicotinamide adenine dinucleotide phosphate (NADP) Coenzyme A (CoA) pyridoxal phosphate, biocytin, tetrahydrofolic acid, coenzyme $B_{12}$, lipoyllysine, 11-cis-retinal, and 1,25-dihydroxycholecalciferol. The term vitamin(s) also includes choline, carnitine, and alpha, beta, and gamma carotenes.

As used in this disclosure, the term "mineral" refers to inorganic substances, metals, and the like required in the human diet. Thus, the term "mineral" as used herein includes, without limitation, calcium, iron, zinc, selenium, copper, iodine, magnesium, phosphorus, chromium and the like, and mixtures thereof.

The dietary supplement may further comprise adjuvants or excipients for providing bulk and bindability to the components. For example, microcrystalline cellulose can be added in appropriate amounts to serve as a flow enhancer/binder, stearic acid as a binder, silicon dioxide as a flow enhancer, hydroxypropylcellulose as a granulating/coating agent, and sodium carboxymethylcellulose as a disintegrant. More generally, the dosage form according to this aspect of the present invention may further include one or more additional adjuvants which can be chosen from those known in the art including flavors, dilutents, colors, binders, filler, compaction vehicles, and non-effervescent disintegrants.

Examples of binders which can be used include acacia, tragacanth, gelatin, starch, cellulose materials such as methyl cellulose and sodium carboxy methyl cellulose, alginic acids and salts thereof, magnesium aluminum silicate, polyethylene glycol, guar gum, polysaccharide acids, bentonites, sugars, invert sugars and the like. Binders may be used in an amount of up to 60% of dry weight and preferably about 10% to about 40% dry weight of the total dry composition.

Non-effervescent disintegrants which may be used include starches as corn starch, potato starch and modified starches thereof, sweeteners, clays, such as bentonite, microcrystalline cellulose, alginates, gums such as agar, guar, locust bean, karaya, pectin and tragacanth. Disintegrants may comprise from 0% up to about 20% dry weight and preferably between about 2 and about 10% of the total dry weight of the composition.

Coloring agents may include titanium dioxide, and dyes suitable for food such as those known as F.D. & C. dyes and natural coloring agents such as grape skin extract, beet red powder, beta-carotene, annato, carmine, tumeric, and paprika. The amount of coloring used may range from about 0.0% to about 3.5% dry weight of the total composition.

Flavors incorporated in the composition may be chosen from synthetic flavor oils and flavoring aromatics and/or naturals oils, extracts from plants, leaves, flowers, fruits and so forth and combinations thereof. These may include cinnamon oil, oil of wintergreen, peppermint oils, clove oil, bay oil, anise oil, eucalyptus, thyme oil, cedar leave oil, oil of nutmeg, oil of sage, oil of bitter almonds and cassia oil. Also useful as flavors are vanilla, citrus oil, including lemon, orange, grape, lime and grapefruit, and fruit essences, including apple, pear, peach strawberry, raspberry, cherry, plum, pineapple, apricot, and so forth. Flavors which have been found to be particularly useful include commercially available orange, grape, cherry and bubble gum flavors and mixtures thereof. The amount of flavoring may depend on a number of factors, including the organoleptic effect desired. Flavors may be present in an amount ranging from about 0% to about 3.0% dry weight based upon the dry weight of the composition. Particularly preferred flavors are the grape and cherry flavors and citrus flavors such as orange.

Tablets according to this aspect of the present invention can be manufactured by well-known tabletting procedures. In common tabletting processes, material which is to be tabletted is deposited into a cavity, and one or more punch members are then advanced into the cavity and brought into intimate contact with the material to be pressed, whereupon compressive force is applied. The material is thus forced into conformity with the shape of the punches and the cavity. Hundreds, and even thousands, of tablets per minute can be produced in this fashion. Various tabletting methods, well known to those skilled in the art, are comprehensively discussed throughout the aforementioned Lieberman text. The dietary supplement may also be used in the form of a capsule.

In an alternative version of the invention, the dietary supplement may be provided in the form of a capsule having an enteric coating so that it can pass through the stomach before being digested within the upper intestine.

Materials to be incorporated in the tablets, other than the microparticles and the effervescent disintegration agent, may be pretreated to form granules that readily lend themselves to tabletting. This process is known as granulation. As commonly defined, "granulation" is any process of size enlargement whereby small particles are gathered together into larger, permanent aggregates to yield a free-flowing composition having a consistency suitable for tabletting. Such granulated compositions may have consistency similar to that of dry sand. Granulation may be accomplished by agitation in mixing equipment or by compaction, extrusion or globulation.

Lubricants, may also be used in the tabletting process. Lubricant as used herein, means a material which can reduce the friction arising at the interface of the tablet and the die wall during compression and ejection thereof. Lubricants may also serve to prevent sticking to the punch and, to a lesser extent, the die wall as well. The term "antiadherents" is sometimes used to refer specifically to substances which function during ejection. As used in the present disclosure, however, the term "lubricant" is used generically and includes "antiadherents". Tablet sticking during formation and/or ejection may pose serious production problems such as reduced efficiency, irregularly formed tablets, and non-uniform distribution of intended agents or ingredients to be delivered thereby. These problems are particularly severe with high speed tabletting approaches and methods.

Lubricants may be intrinsic or extrinsic. A lubricant which is directly applied to the tabletting tool surface in the form of a film, as by spraying onto the die cavity and/or punch surfaces, is known as extrinsic lubricant. Although extrinsic lubricants can provide effective lubrication, their use requires complex application equipment and methods which add cost and reduce productivity. Intrinsic lubricants are incorporated in the material to be tabletted. Magnesium, calcium and zinc salts of stearic acid have long been regarded as the most efficient intrinsic lubricants in common use. Concentrations of one percent or less are usually effective.

Other traditional intrinsic lubricants include hydrogenated and partially hydrogenated vegetable oils, animal fats, polyethyleneglycol, polyoxyethylene monostearate, talc, light mineral oils, sodium benzoate, sodium lauryl sulphate, magnesium oxide and the like. See European Patent Application No. 0,275,834, the disclosure of which is incorporated by reference. See also Leal et al., U.S. Pat. No. 3,042,531.

Lubricants, according to the present invention may be used in an amount of 0% up to 1.5% dry weight and preferably between about 0.5% and 1.0% dry weight of the total composition.

The tablets, for example, those comprising the composition of the preferred embodiment, are typically provided at a dosage rate of two tablets three to four times daily and may be taken with or without food. While it is generally contemplated that the novel dietary supplement will be orally ingested in the form of a tablet or capsule, other dosage forms such as liquid, or liquid suspension are also contemplated. For example, all of the medicines of this invention can be readily made into a beverage. The dried powder or concentrated aqueous solution may be mixed with a syrup formula and then carbonated water added thereto. The amount of the medicine powder may be varied from 2% to 50% by weight of the total composition, and preferably is 5–15%.

In addition to the above disclosed ingredients, the invention can also contain lecithin, flavoring agents, citric acid, and carbohydrates. The beverage composition of this invention may include a soy lecithin for use as an emulsifier and processing aid to improve flow properties. The beverage composition can also contain a flavoring additive. This flavoring additive can include fruit flavors botanical flavors and mixtures thereof. As used herein, the term "fruit flavor" denotes flavors derived from natural edible reproductive parts of seed plants as well as synthetically prepared flavors made to stimulate fruit flavors derived from natural sources. Flavoring additives can include pineapple flavor, orange flavor, lemon flavor, lime flavor, fruit punch and mixtures thereof. Other flavors such as grape flavor, cherry flavor, apple flavor, and mixtures thereof can also be used. The amount of the flavor used depends upon the flavor or flavors selected, the flavor impression desired and the form of flavor additive used. The beverage composition may also contain citric acid to lower the pH of the composition and enhance the flavor.

The beverage composition may also include a carbohydrate source. In particular, these carbohydrates are composed of fructose and maltodextrin. The carbohydrates source provides a combination of simple and complex carbohydrates. Fructose is a simple carbohydrate and provides sweetness, while not disrupting blood sugar levels. Maltodextrin is a complex carbohydrate. The percentages of fructose and maltodextrin may be selected to provide the best taste.

In the composition of the dietary supplement contemplated herein, each dose or tablet of the composition preferably contains the components shown in Table I as a percentage of total dry weight.

TABLE I

| Nutrient | Preferred Range |
|---|---|
| Herbs | |
| Crucifer extract | 5–15% |
| Vigna sinensis | 5–15% |
| Eleutherococcus senticosis | 2–10% |
| Schizandra chinensis | 1–10% |
| Panax quinquefolia | 1–10% |
| Ligustrum lucidum | .5–5% |
| Echinacea angustifolia | .5–5% |
| Artemisia annus | .5–5% |
| Astragalus membranaceous | .25–5% |
| Glycyrrhiza glabra | .25–5% |

TABLE I-continued

| Nutrient | Preferred Range |
|---|---|
| Mallettia dielsiana | .25–5% |
| Ophiopogon japonicus | .25–5% |
| Vitamins/Anti-Oxidants, Minerals | |
| Vitamin C | 5–20% |
| Vitamin E | 2–15% |
| Beta-Carotene | .25–5% |
| Vitamin A | .25–5% |
| Selenium (Selenomethionine) | .05–1% |
| Potassium Iodide | .25–1% |
| Zinc Chelate (Amino Acid) | 1–10% |
| Sodium Alginate | 2–15% |
| Glutathione (Reduced) | 1–10% |
| L-Cysteine | 1–10% |
| L-Methionine | .001–.1% |
| Excipients | |
| Microcrystalline Cellulose | 2–15% |
| Stearic Acid | 2–15% |
| Silicon Dioxide | .5–5% |
| Hydroxypropylcellulose | .25–5% |
| Sodium Carboxymethylcellulose | .25–5% |

In a particularly preferred version of the composition of the invention contemplated herein, each dose or tablet of the composition contains the components shown in Table II in approximately the percentage of total dry weight basis indicated therein.

TABLE II

| Nutrient | Preferred Range |
|---|---|
| Herbs | |
| Crucifer extract | 8–12% |
| Vigna sinensis | 8–12% |
| Eleutherococcus senticosis | 4–8% |
| Schizandra chinensis | 2–6% |
| Panax quinquefolia | 2–6% |
| Ligustrum lucidum | 1–3% |
| Echinacea angustifolia | 1–3% |
| Artemisia annus | 1–3% |
| Asteagalus membranaceous | .5–1.5% |
| Glycyrrhiza glabra | .5–1.5% |
| Mallettia dielsiana | .5–1.5% |
| Ophiopogon japonicus | .5–1.5% |
| Vitamins/Anti-Oxidants, Minerals | |
| Vitamin C | 8–13% |
| Vitamin E | 5–9% |
| Beta-Carotene | 1–3% |
| Vitamin A | .25–1% |
| Selenium (Selenomethionine) | .1–.5% |
| Potassium Iodide | .05–.2% |
| Zinc Chelate (Amino Acid) | 2–6% |
| Sodium Alginate | 6–10% |
| Glutathione (Reduced) | 2–6% |
| L-Cysteine | 2–6% |
| L-Methionine | .001–.01% |
| Excipients | |
| Microcrystalline Cellulose | 2–6% |
| Stearic Acid | 2–6% |
| Silicon Dioxide | 1–3% |
| Hydroxypropylcellulose | .5–2.5% |
| Sodium Carboxymethylcellulose | .5–2% |

In an especially preferred embodiment of the invention, each dose or tablet of the composition contemplated herein contains the components shown in Table III.

TABLE III

| Nutrient | Amount |
|---|---|
| Herbs | |
| Crucifer extract | 125 mg |
| Vigna sinensis | 125 mg |
| Eleutherococcus senticosis | 75 mg |
| Schizandra chinensis | 50 mg |
| Panax quinquefolia | 50 mg |
| Ligustrum lucidum | 25 mg |
| Echinacea angustifolia | 25 mg |
| Artemisia annus | 25 mg |
| Astragalus membranaceous | 12.5 mg |
| Glycyrrhiza glabra | 12.5 mg |
| Mallettia dielsiana | 12.5 mg |
| Ophiopogon japonicus | 12.5 mg |
| Vitamins/Anti-Oxidants, Minerals | |
| Vitamin C (Ascorbic Acid) | 135.5 mg |
| Vitamin E (D-alpha Tocopherol Succinate) | 86.2 mg |
| Beta-Carotene | 24 mg |
| Vitamin A (Palmitate) | 5.5 mg |
| Selenium (Selenomethionine) | 2 mg |
| Potassium Iodide | 0.8 mg |
| Zinc Chelate (Amino Acid) | 50 mg |
| Sodium Alginate | 100 mg |
| Glutathione (Reduced) | 50 mg |
| L-Cysteine | 48.6 mg |
| L-Methionine | 0.05 mg |
| Excipients | |
| Microcrystalline Cellulose | 50 mg |
| Stearic Acid | 50 mg |
| Silicon Dioxide | 24 mg |
| Hydroxypropylcellulose | 20 mg |
| Sodium Carboxymethylcellulose | 15 mg |

The foregoing will be better understood with reference to the following examples which are for the purposes of illustration. They are not to be considered limiting as to the scope and nature of the present invention.

EXAMPLES

In an ongoing study commencing May of 1996, at the Hospitale El Mexico in San Jose, Costa Rica, patients who were documented as having cancers of various organ systems were treated with standard radiation and chemotherapeutic regimens, and were simultaneously given the dietary supplement of the present invention during the course of their oncological therapy. All of the patients' cancers were documented by accepted medical procedures including histological type and grade, appropriate TNM/Dukes staging by surgical evaluation and appropriate scans. Surgical excision, tumor debulking, resection and lymph node dissection and removal were carried out as dictated by the individual presentations. Radiation therapy where appropriate, was administered in accepted dosages in rads/$m^2$ in divided doses utilizing Co 60. All chemotherapeutic agents were administered according to internationally accepted dosage guidelines of $mg/m^2$ or mg/kg appropriate to the histological type and grade as well as the TNM class/Duke's classification/stage of the cancer. Appropriate blood counts and chemistries were obtained serially to monitor effects of systemic chemotherapy and radiation effects. Patients were also clinically monitored for secondary infections, weight loss, wasting, fatigue and other common side effects of chemo/radio therapy.

Hematological parameters of all patients were compared to known statistical occurrence rates for specific chemotherapeutic regimens regarding anemia (AN), leukopenia (LP), granulocytopenia/neutropenia (GCP/NP) and thrombocytopenia (TCP). Occurrence rates of systemic complications, i.e. fever, infection, weight loss and fatigue were also compared in like fashion. Nausea and vomiting were excluded as evaluational parameters due to the use of 5HT3 receptor antagonists prior to chemotherapy doses which are notorious for nausea and emesis.

All patients were given two tablets of the preferred composition TID to be taken with or without food based on the patient's preference upon histopathological confirmation of cancer.

Definition of Laboratory Parameters and Abbreviations:

The following "benchmark" hematological parameters are generally accepted among oncologists internationally by convention. All of the statistics on percentage rates of occurrence where available, are taken from the 1997 Physicians Desk Reference.

| | |
|---|---|
| Leukopenia (LP) | <4000/ml |
| Severe Leukopenia (SLP) | <2000/ml |
| Neutropenia (NP) | <2000/ml |
| Severe Neutropenia (SNP) | <500/ml |
| Thrombocytopenia (TCP) | <100,000/ml |
| Severe Thrombocytopenia (STCP) | 50,000/ml |
| Anemia (AN) | <11 gms Hb/dl |
| Severe Anemia (SAN) | <8 gms Hb/dl |

Clinical Data and Discussion:

The following is a discussion of the types of cancers, stage, treatment synopsis and pertinent laboratory studies of the patients enrolled in the study to date.

Example 1
Adenocarcinoma of the Breast (11 Cases):

| TNM Class: | T1NoMo | 1 patient |
|---|---|---|
| | T2NoMo | 8 patients |
| | T3N1Mo | 2 patients |

Radiotherapy: Consisted of Co 60 radiation to the tumor bed and nodes where clinically indicated.

Chemotherapy: 6 patients received 5-FU (12mg/kg/d ×4d) q 4wks, Daunorubicin (40mg/$m^2$) q 4wks, Cytoxan (40–50mg/kg in divided doses over 4–5 days) q 4wks. 5 patients received 5-FU and Cytoxan in dosages as described above plus Methotrexate (MTX) (15–3omg/d for 5d) q 4wks.

Comments: With 5-FU, the incidence of SLP, SNP, STCP and SAN approached 100% when used in adequate doses. The incidence of infection due to bone marrow and immune suppression was very common. The incidence of LP, NP, TCP and AN with Cytoxan is >50%. The secondary infection rate is commensurate with NP. The incidence of SNP with Daunorubicin is 36% with SNP (<500) being 15%. The incidence of opportunistic infection under these treatment regimes is 40%.

Results: None of the patients enrolled in this portion of the study in this group developed AN, LP, NP or TCP. The incidence of opportunistic infection of any type i.e. viral, bacterial, fungal was 0%. In addition, there was no significant weight loss (>5% body weight) and although subjective, all patients reported feeling energetic with normal appetite and were able to continue with their usual daily activities. All of the patients are presently alive and well without evidence of active malignant disease.

As shown in Table IV, it was expected that there would be 11 cases SLP, SNP, SAN, and STCP. However, with use of the dietary supplement, no cases of SLP, SNP, SAN or STCP were observed. Six cases of opportunistic infections (OI) were expected, but none were observed.

Example 2
Gastrointestinal Tract Malignancies:
Adenocarcinoma of the Rectum (5 cases) and Sigmoid Colon (2 cases)

| Dukes Class: | C | 7 patients |
|---|---|---|

Radiotherapy: Co 60 in divided doses (rectal carcinomas).

Chemotherapy: All patients received 5-FU (12 mg/kg/d x 5d or 450 mg/M$^2$ x 5d initial followed by 450 mg/kg/wk) and Levamisole (50 mg q 8hx3d) q 2wks commensurate with 5-FU administration.

Comments: The incidence of LP with the above combination of therapy is 52%, TCP 18%, AN 6% and opportunistic infection 12%.

Results: None of the patients in this group developed LP, TCP, or AN. The opportunistic infection rate was 0%. There was no significant weight loss or loss of appetite (which may exceed 50% with the above combination of treatments) and again the patients related feelings of well being and were able to continue with their usual daily activities. At the present all patients in this group are alive and without evidence of active disease.

As shown in Table V, it was expected that there would be six cases of LP, and two cases of TCP. However, with the use of the dietary supplement, no cases of LP or TCP were observed. One case of opportunistic infection was expected but was not observed.

Example 3
Adenocarcinoma of Stomach (2 cases)

Radiotherapy: N/A

Chemotherapy: 5-FU (12mg/kg) q 4wks, Cytoxan (10–15mg/kg) q 4wks MTX (15–30mg/d x 5d) q 4wks.

Comments: The incidence of hematological side effects for these chemotherapeutic agents has been discussed above (see Example 1).

Results: None of the patients in this group developed LP, NP, TCP, or AN. There was no significant weight loss. The patients relate normal appetites and report no fatigue. There have been no opportunistic infections in either of these patients.

As shown in Table VI, it was expected that there would be two cases of SLP, SNP, SAN and STCP and one case of OI. However, with the dietary supplement, no cases of SLP, SNP, SAN, STCP or OI were observed.

Example 4
Gynecological Cancers
Invasive Squamous Cell Cancer of the Cervix (6 cases)

| Dukes Class: | 2B | 2 patients |
|---|---|---|
| | 3B | 4 patients |

Radiotherapy: Cobalt 60 radiation in divided doses to the entire pelvis (4000–7000r total dose).

Chemotherapy: None

Comments: Total body irradiation greater than 1000r in a single dose results in complete loss of bone marrow function, central nervous system toxicity, nausea, vomiting, diarrhea and death of the individual within 30 days from anemia, septicemia, encephalitis and carditis. By administering radiation in smaller frequent doses and shielding, we have been able to exceed this amount while reducing the incidence of lethal tissue damage. While bone marrow suppression and subsequent systemic infection from local irradiation is uncommon, tissue inflammation and latent scarring (radiation fibrosis) as well as fatigue are not.

Results: None of the patients in this group developed symptoms of radiation cystitis or colitis and continued to have good appetites and normal activity levels throughout the course of their radiotherapy. It is too early to assess potential radiation fibrosis. All patients in this group have maintained their normal weights and daily activities excepting one patient who had an extremely aggressive radio-resistant tumor which resulted in the patient's death.

Example 5
Adenocarcinoma of the Ovary (5 patients)

Class: Stage III (all cases)

Radiotherapy: none

Chemotherapy: Cis-Platinum (20–140mg/m$^2$) q 4wks, Cytoxan (40–50 mg/kg divided over 4–5 days) q 4wks.

Comments: The hematological toxicity rate for Cytoxan is quoted above. For Cis-Platinum the LP incidence is 97%, SLP 76%, NP 95%, SNP 82%, TCP 60%, STCP 22%, AN 88%, SAN 24%. The opportunistic infection rate exceeds 20%. From 25–34% of patients require transfusions. Weight loss due to nausea, vomiting and loss of appetite is 95%. Three of the above patients had pre-existing pancytopenia as they had been started on chemotherapy prior to beginning to ingest the dietary supplement of the present invention.

Results: Two of the three patients with pre-existing pancytopenia had complete resolution while taking the dietary supplement. The third patient had persistent pancytopenia as well as a pre-existing *Pneumocystis Carinii* infection which required transfusions and antibiotic therapy. The two patients who did not have pre-existing hematological abnormalities have not developed any significant hematological problems. Other than the pre-existing Pneumocystis infection, no opportunistic infections occurred. None of the other patients developed fatigue, loss of appetite or weight loss.

As shown in Table VII, it was expected that there would be five cases of LP and NP, four cases of AN, SLP and SNP, three cases of TCP and OI, and one case of SAN and STCP. However, with the use of the dietary supplement, only one case of LP, NP, TCP, AN, SLP, SNP, SAN and STCP, and no cases of OI, were observed.

Example 6
Choriocarcinoma of the Uterus (3 patients)

Radiotherapy: None

Chemotherapy: Cis-Platinum (20–140 mg/m$^2$) q 4wks, Etoposide (VP-16) (35–50mg/m$^2$/d x 5d) q 4wks, Bleomycin (10–20u/m$^2$ or 0.25–0.50u/kg) q 2wks.

Comments: With VP-16 as a single agent the incidence of LP is 91%, SLP 17%, NP 88%, SNP 37%, TCP 23%, STCP 9%, AN 72%, SAN 19%. In combination with Cis-Platinum the incidence of SLP is 88%. Opportunistic infections occur in 24% of the patients with VP-16 alone. Weight loss occurs in over 40% of patients.

Results: None of the patients in this group developed LP, NP, TCP, or AN. There were no viral, bacterial or fungal infections. All of the patients maintained a normal appetite without weight loss and have continued with their normal daily activities. At the present time all patients are alive and without evidence of active disease.

As shown in Table VIII, it was expected that there would be three cases of LP, NP, SLP, one case of TCP, SNP, and OI, and two cases of AN. However, with the use of the dietary supplement, no cases of LP, NP, SLP, TCP, SNP, OI and AN were observed.

Example 7
Cancers of the Urinary Tract:
Adenocarcinoma of the Prostate (1 case)

| TNM Class | T2N1MO | Gleason Grade IV |
|---|---|---|

Radiotherapy: Cobalt 60

Chemotherapy: None

Results: The patient exhibited no hematological abnormalities and no symptoms of radiation colitis or cystitis.

Example 8
Cancers of the Respiratory Tract:
Adenocarcinoma of the Lung (3 cases)

| TNM Class | T3N1M1 | 3 patients |
|---|---|---|

Radiotherapy: Cobalt 60

Chemotherapy: Cis-Platinum, Bleomycin, VP-16 dosages as described under choriocarcinoma above.

Comments: Toxicity and incidence of hematological adverse reactions are as described under choriocarcinoma.

Results: One patient developed severe leukopenia, neutropenia, thrombocytopenia and anemia which resolved over the course of time without treatment. The remaining cases had no adverse hematological reactions. With the exception of the pancytopenia, the patients subjectively continued to feel well and were able to maintain normal activity levels as well as maintain their body weight.

As shown in Table IX, it was expected that there would be three cases of LP, NP, and SLP, two cases of AN, and one case of TCP, SNP, and OI. However, with the use of the dietary supplement, only one case of LP, NP, TCP, AN, SLP, SNP, and OI was observed.

Example 9
Miscellaneous Malignancies:
Soft Tissue Sarcoma (1 case)

| TNM Class | T1NOM3 |
|---|---|

Radiotherapy: Cobalt 60 to the primary and metastases

Chemotherapy: Ifosfamide (1.2 to 2.4 $gm/m^2/d \times Sd$) q 4wks, MESNA (60% of ifosfamide dose in 3 divided doses).

Comments: The incidence of hematological toxicities with ifosfamide is LP 50–100%, SLP>50%, NP 58–80%, SNP 50%, TCP 20%, STCP 8% AN (due to bone marrow suppression and hemorrhagic cystitis) 46%, hemorrhagic cystitis from 30% to 100%. The addition of MESNA reduces the hemorrhagic cystitis to <7%.

Result: The patient's cancer has not responded to the radiation or chemotherapy and continues to develop multiple metastases. The patient is in the terminal state at the present time.

Conclusions:

On the basis of the above studies, the dietary supplement of the present invention appears to markedly decrease the incidence of chemotherapeutically and radiation-induced hematological toxicities as well as the incidence of opportunistic infections by viral, bacterial and fungal agents. It also has significant beneficial effect on the subjective complaints of loss of appetite and fatigue and alleviates the weight loss so commonly associated with cancer and with the chemotherapy and radiation therapy necessary to control cancer. The dietary supplement of the present invention clearly provides a number of positive benefits to health, specifically in regard to the immune and hematological systems and to the maintenance of normal appetite and weight.

TABLE IV

ADENOCARCINOMA OF THE BREAST

| Treatment | No. of Pat. | $LP_E$ | $LP_o$ | $NP_E$ | $NP_o$ | $TCP_E$ | $TCP_o$ | $AN_E$ | $AN_o$ | $SLP_E$ |
|---|---|---|---|---|---|---|---|---|---|---|
| 5-FU and Cytoxan | 11 | | | | | | | | | 11 |

| Treatment | $SLP_o$ | $SNP_E$ | $SNP_o$ | $SAN_E$ | $SAN_o$ | $STCP_E$ | $STCP_o$ | $OI_E$ | $OI_o$ |
|---|---|---|---|---|---|---|---|---|---|
| 5-Fu and Cytoxan | 0 | 11 | 0 | 11 | 0 | 11 | 0 | 6 | 0 |

TABLE V

GASTROINTESTINAL TRACT MALIGNANCIES

| Treatment | No. of Pat. | $LP_E$ | $LP_o$ | $NP_E$ | $NP_o$ | $TCP_E$ | $TCP_o$ | $AN_E$ | $AN_o$ | $SLP_E$ |
|---|---|---|---|---|---|---|---|---|---|---|
| 5-FU Levamisole | | 6 | 0 | | | 2 | 0 | 0 | 0 | |

| Treatment | $SLP_o$ | $SNP_E$ | $SNP_o$ | $SAN_E$ | $SAN_o$ | $STCP_E$ | $STCP_o$ | $OI_E$ | $OI_o$ |
|---|---|---|---|---|---|---|---|---|---|
| 5-FU Levamisole | | | | | | | | 1 | 0 |

TABLE VI

ADENOCARCINOMA OF THE STOMACH

| Treatment | No. of Pat. | $LP_E$ | $LP_o$ | $NP_E$ | $NP_o$ | $TCP_E$ | $TCP_o$ | $AN_E$ | $AN_o$ | $SLP_E$ |
|---|---|---|---|---|---|---|---|---|---|---|
| 5-FU and Cytoxan | 2 | | | | | | | | | 2 |

| Treatment | $SLP_o$ | $SNP_E$ | $SNP_o$ | $SAN_E$ | $SAN_o$ | $STCP_E$ | $STCP_o$ | $OI_E$ | $OI_o$ |
|---|---|---|---|---|---|---|---|---|---|
| 5-FU and Cytoxan | 0 | 2 | 0 | 2 | 0 | 2 | 0 | 1 | 0 |

TABLE VII

ADENOCARCINOMA OF THE OVARY

| Treatment | No. of Pat. | $LP_E$ | $LP_o$ | $NP_E$ | $NP_o$ | $TCP_E$ | $TCP_o$ | $AN_E$ | $AN_o$ | $SLP_E$ |
|---|---|---|---|---|---|---|---|---|---|---|
| Cytoxan and Cis-Platinum | 5 | 5 | 1 | 5 | 1 | 3 | 1 | 4 | 1 | 4 |

| Treatment | $SLP_o$ | $SNP_E$ | $SNP_o$ | $SAN_E$ | $SAN_o$ | $STCP_E$ | $STCP_o$ | $OI_E$ | $OI_o$ |
|---|---|---|---|---|---|---|---|---|---|
| Cytoxan and Cis-Platinum | 1 | 4 | 1 | 1 | 1 | 1 | 1 | 3 | 0 |

TABLE VIII

CHORIOCARCINOMA OF THE UTERUS

| Treatment | No. of Pat. | $LP_E$ | $LP_o$ | $NP_E$ | $NP_o$ | $TCP_E$ | $TCP_o$ | $AN_E$ | $AN_o$ | $SLP_E$ |
|---|---|---|---|---|---|---|---|---|---|---|
| Cis-Platinum w/VP-16 | 3 | 3 | 0 | 3 | 0 | 1 | 0 | 2 | 0 | 3 |

| Treatment | $SLP_o$ | $SNP_E$ | $SNP_o$ | $SAN_E$ | $SAN_o$ | $STCP_E$ | $STCP_o$ | $OI_E$ | $OI_o$ |
|---|---|---|---|---|---|---|---|---|---|
| Cis-Platinum w/VP-16 | 0 | 1 | 0 | 0 | 0 | 0 | 0 | 1 | 0 |

TABLE IX

CANCERS OF THE RESPIRATORY TRACT

| Treatment | No. of Pat. | $LP_E$ | $LP_o$ | $NP_E$ | $NP_o$ | $TCP_E$ | $TCP_o$ | $AN_E$ | $AN_o$ | $SLP_E$ |
|---|---|---|---|---|---|---|---|---|---|---|
| Cis-Platinum w/VP-16 | 3 | 3 | 1 | 3 | 1 | 1 | 1 | 2 | 1 | 3 |

TABLE IX-continued

| CANCERS OF THE RESPIRATORY TRACT | | | | | | | | | |
|---|---|---|---|---|---|---|---|---|---|
| Treatment | SLP$_o$ | SNP$_E$ | SNP$_o$ | SAN$_E$ | SAN$_o$ | STCP$_E$ | STCP$_o$ | OI$_E$ | OI$_o$ |
| Cis-Platinum w/VP-16 | 1 | 1 | 1 | 0 | 0 | 0 | 0 | 1 | 0 |

Changes may be made in the construction and the operation of the various compositions described herein or in the steps or the sequence of steps of the methods described herein without departing from the spirit and scope of the invention as defined in the following claims.

What is claimed is:

1. A dietary supplement for enhancing the immune system, improving the condition of the blood and for enhancing appetite and decreasing weight loss, comprising on a percentage of dry weight basis:

a crucifer extract, 5–15%; Vigna sinensis, 5–15%; Eleutherococcus senticosis, 2–10%; Schizandra chinensis, 1–10%; Panax quinquefolium, 1–10%; Ligustrum lucidum, 0.5–5%; Echinacea angustifolium, 0.5–5%; Artemisia annus, 0.5–5%; Astragalus membranaceous, 0.25–5%; Glycyrrhiza glabra, 0.25–5%; Mallettia dielsiana, 0.25–5%; Ophiopogon japonicus, 0.25–5%; selenium, 0.05–1%; glutathione (reduced), 1–10%; L-cysteine, 1–10%; L-methionine, 0.001–0.1%; and excipients, from about 15% to about 85%.

2. The dietary supplement of claim 1 further comprising: vitamin C, 5–20%; vitamin E, 2–15%; beta-carotene, 0.25–15%; vitamin A, 0.25–15%; potassium iodide, 0.25–1%; zinc chelate (amino acid), 1–10%; and sodium alginate, 2–15%.

3. The dietary supplement of claim 1 wherein the crucifer extract is derived from the genus Brassica.

4. The dietary supplement of claim 1 wherein the crucifer extract is derived from *Brassica pekingensis*.

5. The dietary supplement of claim 1 wherein the selenium is provided as selenomethionine.

6. The dietary supplement of claim 1 further comprising an oral dosage form selected from the group consisting of a tablet, a capsule, a powder and a liquid suspension.

7. A dietary supplement for enhancing the immune system, improving the condition of the blood and for enhancing appetite and decreasing weight loss, comprising on a percentage of dry weight basis:

a crucifer extract, 5–15%; Vigna sinensis, 5–15%; Eleutherococcus senticosis, 2–10%; Schizandra chinensis, 1–10%; Panax quinquefolium, 1–10%; Ligustrum lucidum, 0.5–5%; Echinacea angustifolium, 0.5–5%; Artemisia annus, 0.5–5%; Astragalus membranaceous, 0.25–5%; Glycyrrhiza glabra, 0.25–5%; Mallettia dielsiana, 0.25–5%; Ophiopogon japonicus, 0.25–5%; vitamin C, 5–20%; vitamin E, 2–15%; beta-carotene, 0.25–15%; vitamin A, 0.25–15%; selenium, 0.05–1%; potassium iodide, 0.25–1%; zinc chelate (amino acid), 1–10%; sodium alginate, 2–15%; glutathione (reduced), 1–10%; L-cysteine, 1–10%; L-methionine, 0.001–1%; and excipients, from about 10% to about 75%.

8. The dietary supplement of claim 7 wherein the crucifer extract is derived from the genus Brassica.

9. The dietary supplement of claim 8 wherein the crucifer extract is derived from *Brassica pekingensis*.

10. The dietary supplement of claim 7 wherein the selenium is provided as selenomethionine.

11. The dietary supplement of claim 7 further comprising an oral dosage form selected from the group consisting of a tablet, a capsule, a powder and a liquid suspension.

12. A method for enhancing the immune system, improving the condition of the blood and for enhancing appetite and decreasing weight loss, comprising:

providing to a subject in need of such therapy an effective amount of a dietary supplement comprising on a percentage of dry weight basis:

a crucifer extract, 5–15% ; Vigna sinensis, 5–15%; Eleutherococcus senticosis, 2–10%; Schizandra chinensis, 1–10%; Panax quinquefolium, 1–10%; Ligustrum lucidum, 0.5–5%; Echinacea angustifolium, 0.5–5%; Artemisia annus, 0.5–5%; Astragalus membranaceous, 0.25–5%; Glycyrrhiza glabra, 0.25–5%; Mallettia dielsiana, 0.25–5%; Ophiopogon japonicus, 0.25–5%; selenium, 0.05–1%; glutathione (reduced), 1–10%; L-cysteine, 1–10%; L-methionine, 0.001–0.1%; and excipients, from about 15% to about 85%.

13. The method of claim 12 wherein the dietary supplement further comprises:

vitamin C, 5–20%; vitamin E, 2–15%; beta-carotene, 0.25–15%;

vitamin A, 0.25–15%; potassium iodide, 0.25–1%; zinc chelate (amino acid), 1–10%; and sodium alginate, 2–15%.

14. The method of claim 12 wherein the crucifer extract of the dietary supplement is derived from the genus Brassica.

15. The method of claim 14 wherein the crucifer extract of the dietary supplement is derived from *Brassica pekingensis*.

16. The method of claim 12 wherein the selenium is provided as selenomethionine.

17. The method of claim 12 wherein the dietary supplement is provided as a dosage form selected from the group consisting of a tablet, a capsule, a powder, and a liquid suspension.

18. A method for enhancing the immune system, improving the condition of the blood and for enhancing appetite and decreasing weight loss, comprising:

providing to a subject in need of such therapy an effective amount of a dietary supplement comprising on a percentage of dry weight basis:

a crucifer extract, 5–15%; Vigna sinensis, 5–15%; Eleutherococcus senticosis, 2–10%; Schizandra chinensis, 1–10%; Panax quinquefolium, 1–10%; Ligustrum lucidum, 0.5–5%; Echinacea angustifolium, 0.5–5%; Artemisia annus, 5–5%; Astragalus membranaceous, 0.25–5%; Glycyrrhiza glabra, 0.25–5%; Mallettia dielsiana, 0.25–5%; Ophiopogon japonicus, 0.25–5%; vitamin C, 5–20%; vitamin E, 2–15%; beta-carotene, 0.25–15%; vitamin A, 0.25–15%; selenium, 0.05–1%; potassium iodide, 0.25–1%; zinc chelate (amino acid), 1–10%; sodium alginate, 2–15%; glutathione (reduced), 1–10%; L-cysteine, 1–10%; L-methionine, 0.001–0.1%; and excipients, from about 10% to about 75%.

19. The method of claim 18 wherein the crucifer extract of the dietary supplement is derived from the genus *Brassica*.

20. The method of claim 19 wherein the crucifer extract of the dietary supplement is derived from *Brassica pekingensis*.

21. The method of claim 18 wherein the selenium is provided as selenomethionine.

22. The method of claom 18 wherein in the dietary supplement is provided as a dosage form selected from the group consisting of a tablet, a capsule, a powder, and a liquid suspension.

* * * * *